Figure 5:
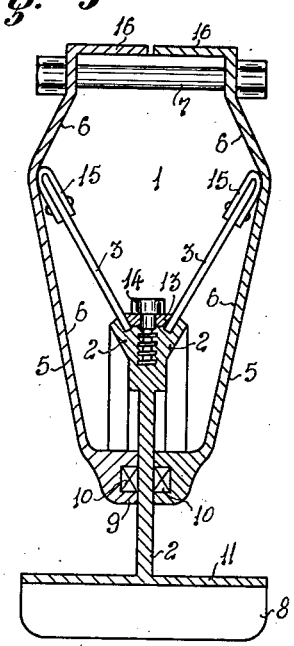

April 27, 1937. C. M. ARCE 2,078,554
ELASTIC WHEEL FOR VEHICLES IN GENERAL
Filed Sept. 19, 1934 3 Sheets-Sheet 1
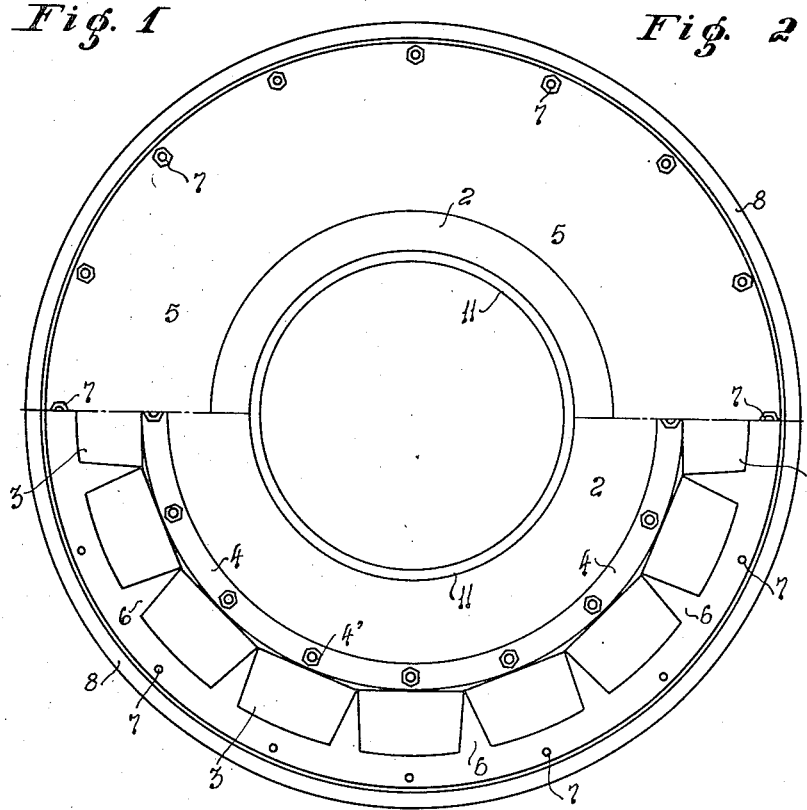
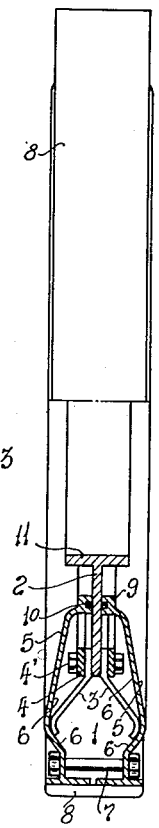
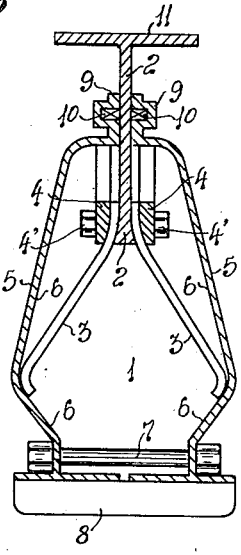
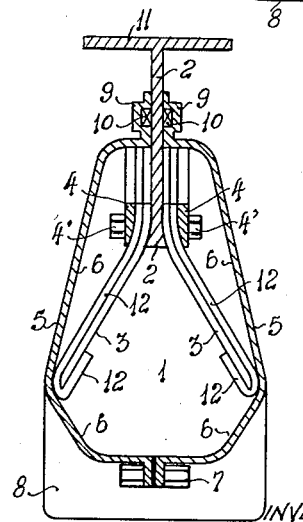
INVENTOR
CARLOS MANUEL ARCE
BY
Richards & Geier
ATTORNEYS April 27, 1937.   C. M. ARCE   2,078,554
ELASTIC WHEEL FOR VEHICLES IN GENERAL
Filed Sept. 19, 1934   3 Sheets-Sheet 2

INVENTOR
CARLOS MANUEL ARCE
BY
Richards & Geier
ATTORNEYS

April 27, 1937.  C. M. ARCE  2,078,554
ELASTIC WHEEL FOR VEHICLES IN GENERAL
Filed Sept. 19, 1934    3 Sheets-Sheet 3

INVENTOR
CARLOS MANUEL ARCE
BY
Richards & Geier
ATTORNEYS

Patented Apr. 27, 1937

2,078,554

UNITED STATES PATENT OFFICE 2,078,554

ELASTIC WHEEL FOR VEHICLES IN GENERAL

Carlos Manuel Arce, Buenos Aires, Argentina

Application September 19, 1934, Serial No. 744,677
In Argentina November 6, 1933

5 Claims. (Cl. 152—28)

My invention refers to a new elastic wheel for vehicles in general and more particularly for those driven by a motor, which wheel replaces with economical advantages, the pneumatic wheels.

The principal feature of my invention consists in that the wheel is composed of a hollow ring, within which turns a disc concentric with the ring, guided by the limit edges of the walls forming the ring, the said disc carrying elastic plates or bars placed radially on the periphery of same, in a convenient number, the said plates or bars being fixed to the disc in the most convenient form or else forming a whole with the disc, with diverging free ends that press strongly making friction against the internal opposed lateral faces of the walls of the hollow ring, which present inclined symmetric surfaces forming a profile nearly cuneal, so that when the disc or hollow ring supports a pressure larger than the pressure exerted by the elastic plates or bars, on the internal opposed faces of the walls of the hollow ring, the disc and its elastic plates or bars, can glide between the said faces of friction in a movement relative with the hollow ring becoming mutually eccentric and adopting again a concentric position by the elastic reaction of the free ends of the plates or bars, on the internal lateral faces of the hollow ring, once the strength to which the disc or the hollow ring was put disappears. Inversely, the elastic plates or bars can be secured or similarly disposed in the internal faces of the walls that form the hollow ring, applying its free converging ends on the external lateral opposed faces of the periphery of the disc, which section is also in this case of a profile nearly cuneal.

As a consequence of the friction that exerts the elastic plates or bars on the friction faces of the hollow ring or on the disc, the relative eccentric movement of both may be guided by the free ends of the said elastic plates or bars.

Another feature of my invention consists in that the relative eccentric movement of the disc and the hollow ring, is guided by the limit edges of the walls that form the ring, pressing on the disc between the part of the same comprised in the interior of the hollow ring and the part that projects outside the same.

Another feature of my invention consists in that the section of the elastic plates or bars can be rectangular, square, round or that more convenient for obtaining a smooth elasticity, disposing its free ends in a diverging or converging form when securing same to the disc or to the walls of the hollow ring in the most convenient form.

Another feature of my invention consists in that the profile of the internal section of the walls that form the hollow ring or of the periphery of the disc, may be parabolic, double parabolic or of another convenient form, having approximately the appearance of a wedge or of a double wedge.

Another feature of my invention consists in that the relative eccentric movement of the disc and of the hollow ring, may be guided by the free ends of the elastic plates or bars that exert strong lateral pressure on the friction faces of the hollow ring or of the disc, of a profile nearly cuneal, either forming a parabolic section or other more convenient, and the relation of contact between the elastic plates or bars and the friction faces on which they press, can be made effective, besides the strength that is exerted on those faces, by employing any means known in technology.

It may also be established internal or external vinculation between the disc and the hollow ring for the case that the adherence by friction be not sufficient for obtaining that both parts run together in their relative movement of advance or rotation. Said vinculation may be elastic or by mechanical contact.

Another feature of the invention consists in that the elastic plates or bars can be placed radially in various successive rows.

Another feature consists in that the disc may be formed of a central body divided peripherically in radial elastic plates or bars that diverge to one and the other plane of the central body and this last is fixed directly to the axle of the wheel in the most convenient form.

Another feature of the invention consists in that the elastic plates or bars may be placed in pockets made of leather or other convenient material, or may carry on their free ends a lining of leather, rubber, canvas or other suitable material.

Another feature consists in that the hollow ring is constituted by walls properly fixed together, the interior faces of which present inclined symmetric faces, obtaining a cuneal profile, or nearly cuneal or of double cuneal shape, a profile that may have a parabolic or other convenient section. In the reverse case, are the opposed faces of the disc that present a cuneal section where rest and may friction the elastic plates or bars. In this case, the walls of the ring may present a circular section or nearly circular section.

Another feature of the invention consists in that the hollow ring or disc, indistinctly may carry, the running surfaces that are in contact with the road, formed of a convenient material (rubber, leather, etc.) since the hollow ring as the disc, can constitute the periphery of the wheel.

Another feature consists in that the pockets or coverings of the elastic plates or bars, carry a convenient lubricant in contact with the plates or bars.

Another feature consists in that the empty space of the hollow ring may be filled with a substance appropriate for making more smooth the movement of the elastic plates or bars with relation to the friction faces and, for securing a convenient adherence between them.

Description will be made hereinafter of various preferred forms of the invention, with reference to the accompanying drawings; it will be understood, however, that various other forms may be adopted within the object and purposes of the invention and within the features mentioned in the claims at the end of this specification, to which such forms I make extensive my rights.

Figure 6:
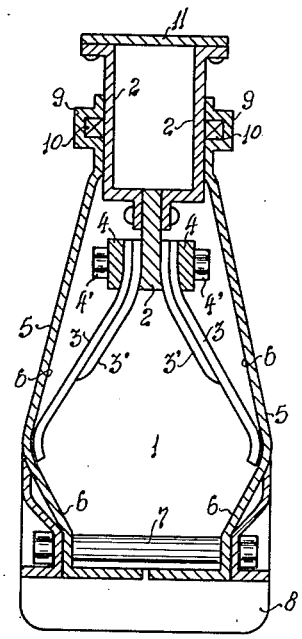
Figure 7:
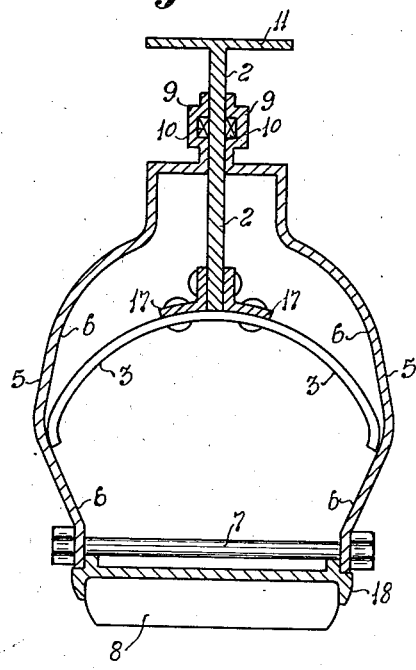
Figure 8:
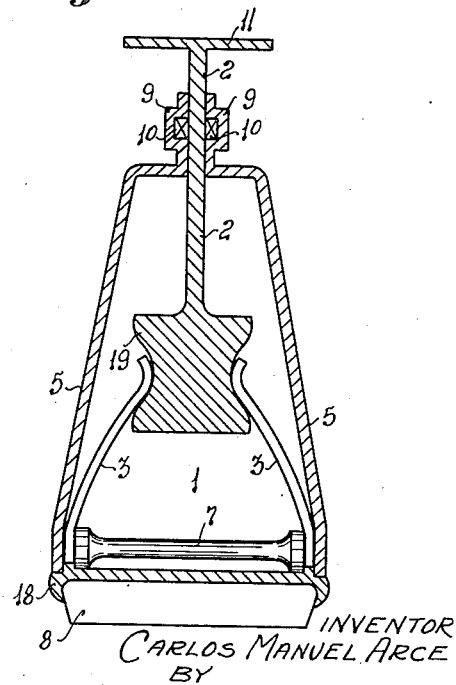
Figure 9:
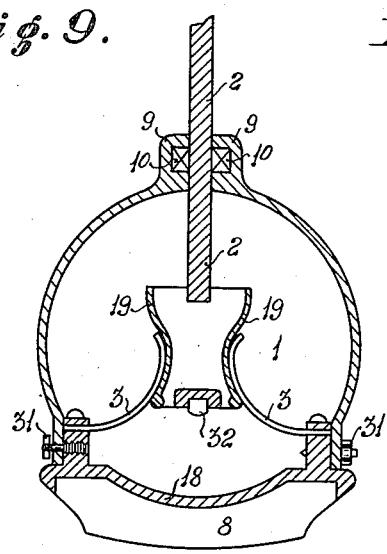
Figure 10:
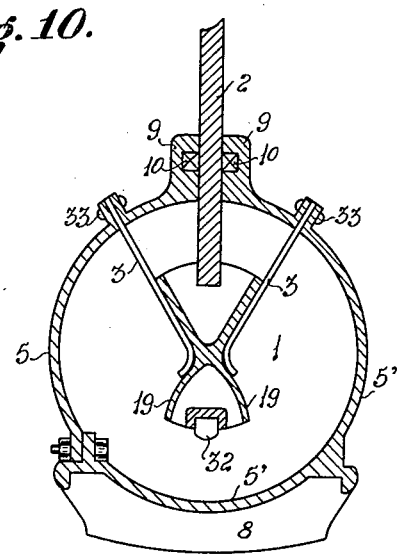
Figure 11:
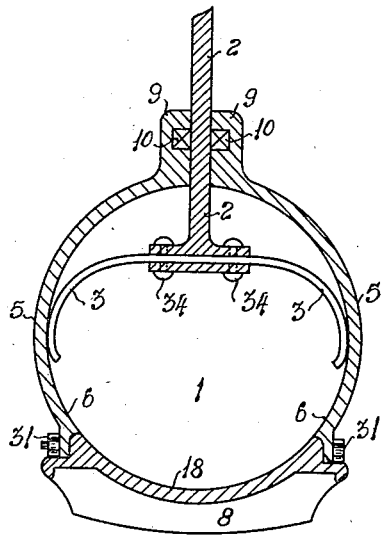
Figure 12:
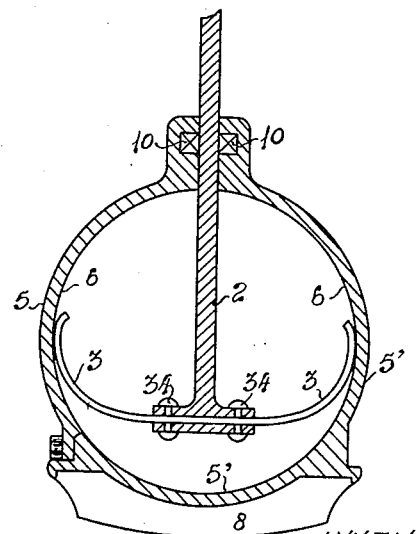

In the drawings,

Fig. 1 represents a side view of an elastic wheel's top half and a cut of the bottom half, showing the disc with the elastic plates, the free ends of which are directed towards the periphery of the wheel, Fig. 2 is a partial section and a front view of Fig. 1, Fig. 3 is a section of the wheel in an enlarged scale, showing the elastic plates united to the disc by one end and the other end making friction on the internal lateral faces of the hollow ring, which is provided with the running surface, Fig. 4 shows a section of the wheel in which, the symmetric walls that form the hollow ring are of steel pressed plate and the elastic plates or bars are covered with leather. The hollow ring carries the running surface, Fig. 5 represents a section of a wheel in which the disc carries the running surface and the hollow ring is conveniently fixed to the axle, contrary to what happens in the former cited figures in which it is the disc which is conveniently fixed to the axle of the hollow ring carrying the running surface. The elastic plates or bars are provided with leather linings at their free ends that are directed towards the centre of the wheel, Fig. 6 is a cut of a wheel such as that of Fig. 3, but in this case with elastic plates arranged in two superposed rows of different length, secured to the disc that is made of double wall of steel plate, same as those of the hollow ring, Fig. 7 is a cut of a wheel showing a type of curved elastic plate, the diverging free ends of which make friction with the internal faces of the hollow ring and this is formed by symmetrical walls of pressed steel plate of a section approximately circular, Fig. 8 shows a cut of a wheel in which the elastic plates or bars are fixed in the internal walls of the hollow ring and the disc has, on its periphery, external faces of a section of double cuneal shape, where press and frictionate the free ends of the elastic plates or bars directed towards the centre of the wheel. The hollow ring carries the running surface, Fig. 9 represents a section of an elastic wheel with elastic plates or bars curved, Fig. 10 represents a section of an elastic wheel in which, the hollow ring is composed of two circular walls, one of which comprises the tire of the wheel with the running surface. The elastic plates or bars are fixed radially and symmetrically to each one of these parts and the free converging ends are directed towards the periphery of the wheel until contacting and making friction with the external lateral faces of the periphery of the disc which is of a section of double cuneal shape, Fig. 11 represents a section of an elastic wheel in which the hollow ring is composed of three parts of wall conveniently secured together and of which, one serves as a tire with the running surface and the other two of a circular section or approximately circular, are symmetrically disposed. The elastic plates or bars are curved and secured with pins or rivets to the periphery of the disc, radially disposed and the diverging free ends are directed towards the periphery of the wheel until contacting and making friction with the internal lateral faces of a circular or approximately circular shape of the hollow ring, and Fig. 12 represents a section of an elastic wheel similar to that shown in Figure 11, in which the hollow ring is composed of two circular walls, one of them comprising the tire with the running surface. The elastic plates or bars are curved and are secured to the disc as shown in Figure 11, directing the free ends diverging, towards the center of the wheel until contacting and making friction with the internal lateral faces of the circular or approximately circular shape of the hollow ring.

In Figures 1, 2, 3, the elastic wheel is formed by the hollow ring 1, the disc 2, the elastic plates 3 secured by one end to the disc 2 with the rings 4 and pins 4' or simply riveted to the disc, while the free ends rest strongly on the internal lateral opposed faces 6 of the walls 5 which, symmetrically disposed, form the hollow ring 1. The inclined symmetric surfaces 6 of the internal faces of the walls 5 form a profile of double cuneal shape, on which glide, frictionating, the elastic plates 3. The walls 5 are secured together with pins 7 and on the periphery carry the running surface 8 of rubber, leather or other convenient material.

The disc 2 is guided by the limit edges 9 of the walls 5 of the hollow ring 1. The edges 9 carry contact surfaces tight 10 for preventing the passage of water to the interior of the hollow ring 1 or leakages of the substance with which this may be filled. It may also be the disc 2 guided by the free ends of the elastic plates or bars 3, when these press strongly on the friction faces 6.

The end 11 of the disc 2 is conveniently fixed to the axle of the wheel (not shown).

In Figure 4 the elastic plates or bars 3 carry a lining of leather 12 and the walls 5 of pressed steel plate, carry a lining of rubber 8 in their bases, for serving as running surface.

In Figure 5 the elastic plates or bars 3 are fixed to the disc 2 by means of the parts 13 and the screws 14. The free diverging ends of the plates or bars 3 carry a covering 15 of leather and are directed towards the center of the wheel. The disc 2 carries a lining of rubber at its end 11 that serves as running surface. The axle of the wheel (not shown) is conveniently fixed to the base 16 of the ring 1.

In Figure 6 the elastic plates 3 are placed in two superposed rows 3, 3' of different length and the free ends of the larger ones rest by friction on the opposed internal lateral faces 6 of the walls 5 of steel plate which, being symmetrically disposed, form the hollow ring 1. The disc is also of double wall 2 of steel pressed plate, in that part that projects outside of the hollow ring 1.

In Figure 7 the elastic plates or bars 3, are fixed to the disc 2 by means of screws or rivets with the angle piece 17 and the opposed diverging free ends make friction against the internal faces 6 of the symmetric walls 5 of steel pressed plate, approximately circular, of the hollow ring 1. The walls 5 are fixed together with the pins 7, pressing the tire 18 that carries the running surface 8.

In Figure 8 the elastic plates or bars 3 are fixed to the walls 5 with the pins 7, that also press those walls with the tire 18 which carries the running surface 8. The plates or bars 3 make friction with their free ends against the lateral opposed external faces 19 of the disc 2, serving the first as a guide to the movement of the disc 2.

In Figure 9 the hollow ring 1 is composed of two walls of circular section placed symmetrically and secured with screws 31 to the tire 18 that carries the running surface 8 of rubber. The curved elastic plates or bars 3 are fixed symmetrically and radially in relation to the walls to the tire 18 by means of the screws 31 and their free converging ends are directed towards the center of the wheel until contacting and making friction with the external lateral faces 19 of the periphery of the disc 2 that presents a section of double cuneal shape. The edge of the periphery of the disc 2 carries a rubber ring 32 for absorbing the shock of the tire 18 when the descending weight of the vehicle is so strong that it will exceed a fixed limit.

In Figure 10 the walls 5 and 5' are circular and non-symmetric, comprising the tire 5' of the wheel that carries the running surface 8. The elastic plates or bars 3 are secured symmetrically and radially to each one of the walls 5, 5' with rivets 33 and the free converging ends are directed towards the periphery of the wheel until contacting and making friction against the external lateral faces 19 of the periphery of the disc 2.

In Figure 11 the hollow ring 1 is composed of two walls 5 of a section circular or nearly circular disposed symmetrically and secured with screws 31 to the tire 18 that carries the running surface 8. The elastic plates or bars are curved and fixed with screws or rivets 34 to the periphery of the disc 2 disposed radially and the free diverging ends are directed towards the periphery of the wheel until contacting and making friction with the internal circular lateral faces 6 or approximately circular of the ring 1.

In Figure 12, the walls 5 and 5' are circular and non-symmetrical; they include the tire 51 of the wheel with the running surface 8. The elastic plates or bars 3 are curved and symmetrically secured, radially, to the periphery of the disc 2 with bolts or rivets 34 and the diverging free ends are directed towards the centre of the wheel until contacting and making friction with the internal circular, lateral or approximately circular faces 6 of the ring 1.

In any case, the interior of the hollow ring 1 may be filled with a lubricant or with an apparent substance for smoothing the elastic relative movement of the elastic plates or bars and the hollow ring, thus securing a convenient adherence between the plates or bars and the faces of friction of the hollow ring and the disc.

Having now particularly described and ascertained the nature of my invention and how same can be carried into practice, I declare that what I claim is:

1. An elastic wheel for vehicles comprising in combination with a wheel supporting member, a central disc adapted to be mounted on said wheel supporting member, a surrounding housing slidably mounted on said disc, partly enclosing the same and adapted to serve as tire member, said housing having a converging peripheral portion, and a plurality of pairs of diverging elastic plates within said housing peripherally secured at one end to said central disc, the diverging free ends being in frictional contact with the walls of the converging portion of said housing, whereby the contact between said housing and said disc will be maintained under initial compression and whereby said housing will be reciprocated and centrally displaced on said disc in absorbing shocks and vibrations.

2. An elastic wheel for vehicles, comprising a central member having a ring portion adapted to be mounted upon a wheel axle and an annular disc-shaped portion having side surfaces extending substantially at right angles to said ring portion and an end surface interconnecting said side surfaces and extending substantially parallel to said ring portion; a housing having a bottom wall adapted to serve as a tire member and converging peripheral walls situated on both sides of said bottom wall, the converging ends of said peripheral walls being situated one opposite the other and being in frictional contact with said side surfaces of the disc-shaped portion of said central member, whereby said housing partly encloses said disc-shaped portion, at least two resilient plates which are divergent in relation to each other, and means connecting the adjacent ends of said plates to said side surfaces of the disc-shaped portion adjacent said end surface thereof, whereby said resilient divergent plates are entirely enclosed by said housing, the opposite diverging ends of said plates being free and being in frictional contact with said peripheral walls of the housing, whereby said housing will be displaced relatively to said disc-shaped portion in absorbing shocks and vibrations.

3. An elastic wheel for vehicles, comprising a central member having a ring portion adapted to be mounted upon a wheel axle and an annular disc-shaped portion having side surfaces extending substantially at right angles to said ring portion and an end surface interconnecting said side surfaces and extending substantially parallel to said ring portion; a housing having a bottom wall adapted to serve as a tire member and converging peripheral walls situated on both sides of said bottom wall, the converging ends of said peripheral walls being situated one opposite the other and being in frictional contact with said side surfaces of the disc-shaped portion of said central member, whereby said housing partly encloses said disc-shaped portion, at least two resilient plates which are divergent in relation to each other, and means connecting the adjacent ends of said plates to said side surfaces of the disc-shaped portion adjacent said end surface thereof, whereby said resilient divergent plates are entirely enclosed by said housing, the opposite diverging ends of said plates having the form of hooks, the bent portions of said hook-shaped ends being in frictional contact with said peripheral walls of the housing, whereby said housing will be displaced relatively to said disc-shaped portion in absorbing shocks and vibrations.

4. A resilient wheel for vehicles comprising a central member adapted to be mounted on a wheel axle and a tire member, an annular disc mounted on one of said members, an annular closed casing forming an annular space about said disc and being in direct frictional engagement with said disc at one end and at the other end connected with one of said members, whereby said disc may be reciprocated within said casing, means carried by said disc within said closed casing and separate means carried by said casing in direct frictional and tensional engagement with said first mentioned means for maintaining the contact between said disc and said closed casing under a predetermined compression and whereby said casing will slide on said disc against the resistance created by said coacting means.

5. A resilient wheel for vehicles comprising a central member adapted to be mounted on a wheel axle and a tire member, an annular disc mounted on said central member, an annular closed casing forming an annular space about said disc and being in frictional engagement with said disc at one end and at the other end connected to said tire member whereby said disc may be reciprocated within said casing, means carried by said disc within said closed casing and separate means carried by said casing in frictional and tensional engagement with said first mentioned means for maintaining the contact between said disc and said casing under a predetermined compression and whereby said casing will slide on said disc and be centrally displaced against the resistance created by said coacting means.

CARLOS MANUEL ARCE.